United States Patent
Chen

(10) Patent No.: US 7,357,154 B1
(45) Date of Patent: Apr. 15, 2008

(54) MULTI-STAGE POSITIONING STRUCTURE FOR A CERAMIC VALVE CORE

(75) Inventor: Mei-Li Chen, Tanzih Township, Taichung County (TW)

(73) Assignee: Kuching International Ltd., Taichung County (TW)

( * ) Notice: Subject to any disclaimer, the term of this patent is extended or adjusted under 35 U.S.C. 154(b) by 0 days.

(21) Appl. No.: 11/556,986

(22) Filed: Nov. 6, 2006

(51) Int. Cl.
*F16K 11/00* (2006.01)

(52) U.S. Cl. ............... 137/625.17; 137/801; 251/297

(58) Field of Classification Search ............. 251/297; 137/625.17, 801
See application file for complete search history.

(56) References Cited

U.S. PATENT DOCUMENTS

| | | | | |
|---|---|---|---|---|
| 3,341,088 A | * | 9/1967 | Moynihan | 251/297 |
| 4,301,830 A | * | 11/1981 | Keller, III | 251/297 |
| 4,325,403 A | * | 4/1982 | Uhlmann | 137/625.17 |
| 4,960,154 A | * | 10/1990 | Dagiantis | 137/625.17 |
| 5,494,077 A | * | 2/1996 | Enoki et al. | 137/625.17 |
| 5,522,429 A | * | 6/1996 | Bechte et al. | 137/625.17 |
| 5,538,041 A | * | 7/1996 | G anzle | 137/625.17 |
| 5,592,971 A | * | 1/1997 | Knapp | 251/297 |
| 5,836,333 A | * | 11/1998 | Haynes | 251/297 |
| 6,019,132 A | * | 2/2000 | Knapp | 137/625.17 |
| 6,796,544 B1 | * | 9/2004 | Chen | 251/205 |
| 2006/0144449 A1 | * | 7/2006 | Cattaneo | 137/625.17 |

* cited by examiner

*Primary Examiner*—John Bastianelli
(74) *Attorney, Agent, or Firm*—Egbert Law Offices

(57) ABSTRACT

A ceramic valve core has a multi-stage positioning structure. The multi-stage positioning structure includes a first snapper, which can move along with the swaying motion of the brake valve handle of the ceramic valve core, and a second snapper, which is an integrated component positioned correspondingly to the displacement track of the said first snapper. At the corresponding ends of the first snapper and the second snapper, there is a snap ring mated with at least two pin joint ends. The positioning structure also includes a flexible member, which allows the first snapper or second snapper to operate flexibly. The multi-stage positioning structure of the present invention is sturdy because the first snapper is of a combined type and is flexible thanks to the flexible member.

5 Claims, 9 Drawing Sheets

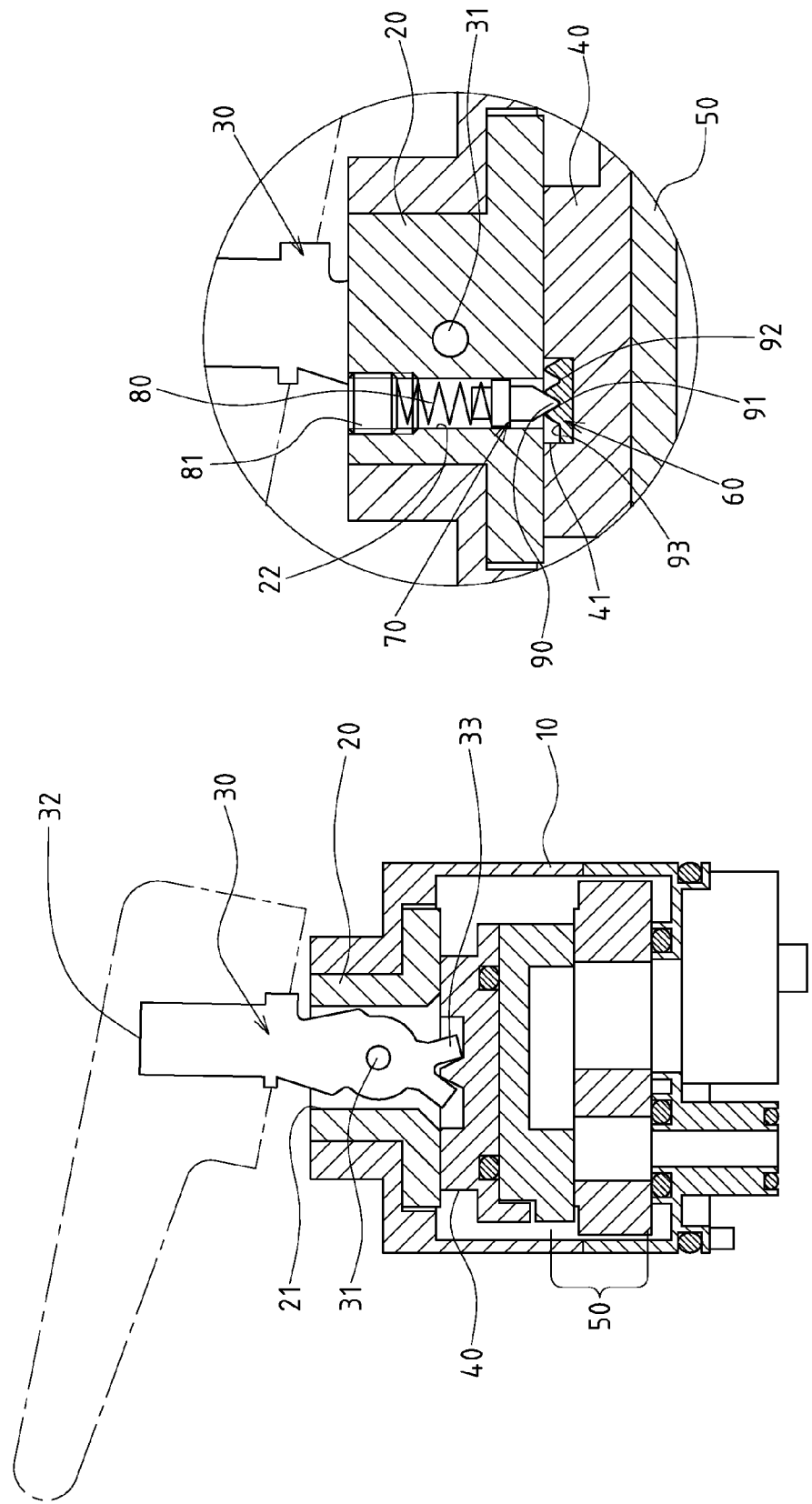

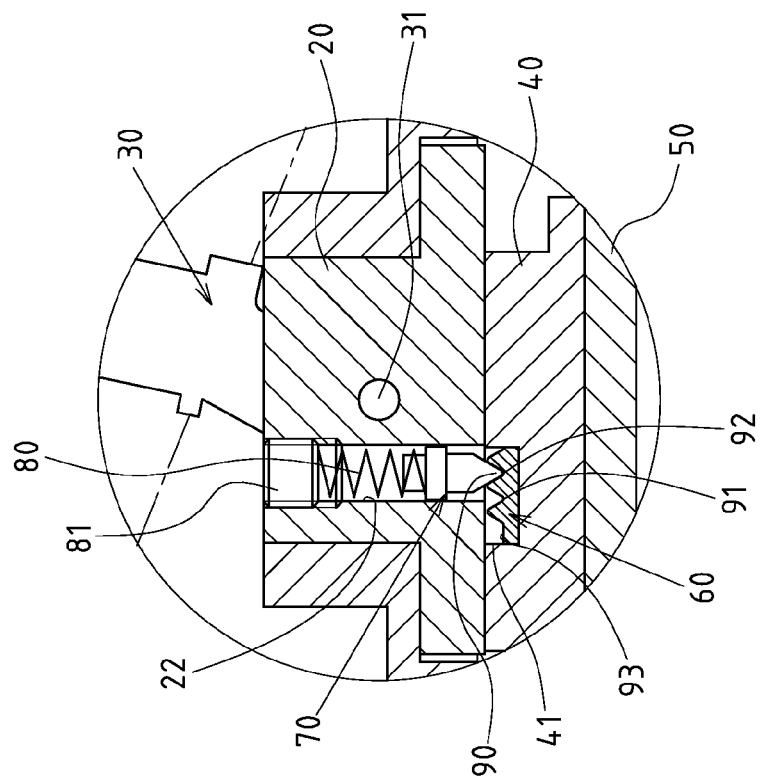
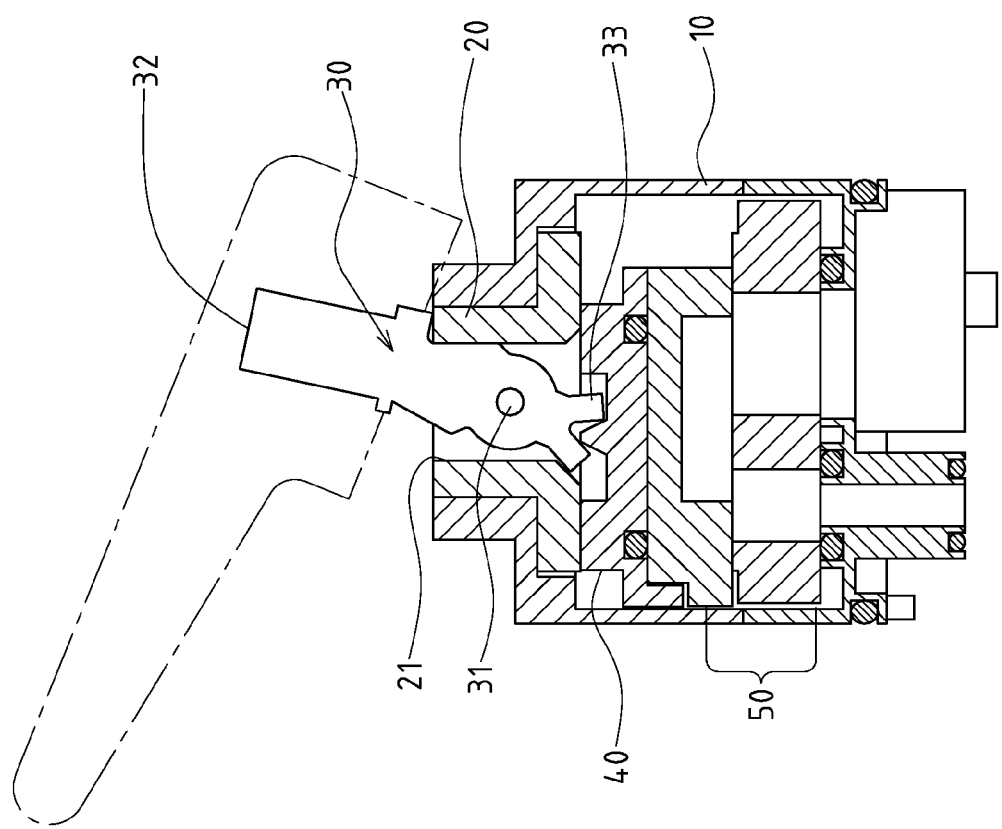
FIG.8
FIG.7

# MULTI-STAGE POSITIONING STRUCTURE FOR A CERAMIC VALVE CORE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a ceramic valve core, and more particularly to an innovative valve core with a multi-stage positioning structure.

2. Description of Related Art Including Information Disclosed Under 37 CFR 1.97 and 37 CFR 1.98.

The ceramic valve core is commonly used to adjust and control a water supply and temperature state via a swaying motion of a vertical brake valve handle. When conventional ceramic valve cores are used along with brake valve handles without multi-stage positioning properties, any manual operation will make it possible to turn the water tap to maximum water flow, thus leading to waste of water resources. Subsequently, a brake valve handle is developed with an improved multi-stage positioning structure. For a typical positioning structure, some projecting points are formed on the external wall of the valve handle, while a few positioning grooves are placed correspondingly on the body of the ceramic valve core. Therefore, when the brake valve handle sways, the projecting points can be snapped into the positioning grooves depending upon varying preset angles.

This prior art structure is found to have the following disadvantages in actual operation:

1. Since the projecting points are directly preformed on the brake valve handle, the growing utilization of the brake valve handle will surely lead to wearing, deformation and thinning of projecting points with prejudice to the service life of the multi-stage positioning structure.
2. The typical projecting point is snapped tightly into the positioning groove with a fixed strength. However, ceramic valve cores are often marketed around the world, making the fixed positioning structure unsuitable for the numerous markets with a view to different operating forces and habits of customers.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The enhanced efficacy of the present invention is the practical advancement of the multi-stage positioning structure of the ceramic valve core disclosed in the present invention. The positioning structure comprises a first snapper 60, second snapper 70 and flexible member 80. Compared to prior art, the multi-stage positioning structure of the present invention is sturdier because the first snapper 60 is of a combined type and is flexible thanks to the flexible member 80. Hence, the life span is greatly elongated, and the locking effect can be maintained for a long period.

Moreover, in the present invention, the structure of the spacer 70 of the second snapper 70 of the flexible member 80 can be of a screw bolt type, so that the elastic strength of the flexible member 80 can be adjusted through the up and down motion caused by turning the spacer 81 clockwise or anticlockwise. Consequently, the resistance strength of the positioning locking during the swaying motion of the brake valve handle 30 can be adjusted to meet the needs of different users.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 5 shows a sectional view of the internal structure of the ceramic valve core in the second operation state of the present invention.

FIG. 6 shows a sectional view of the operation of the positioning structure corresponding to the state shown in FIG. 5.

FIG. 7 shows a sectional view of internal structure of the ceramic valve core in the third operation state of the present invention.

FIG. 8 shows a sectional view of the operation of the positioning structure corresponding to the state shown in FIG. 7.

DETAILED DESCRIPTION OF THE INVENTION

Figure 1:
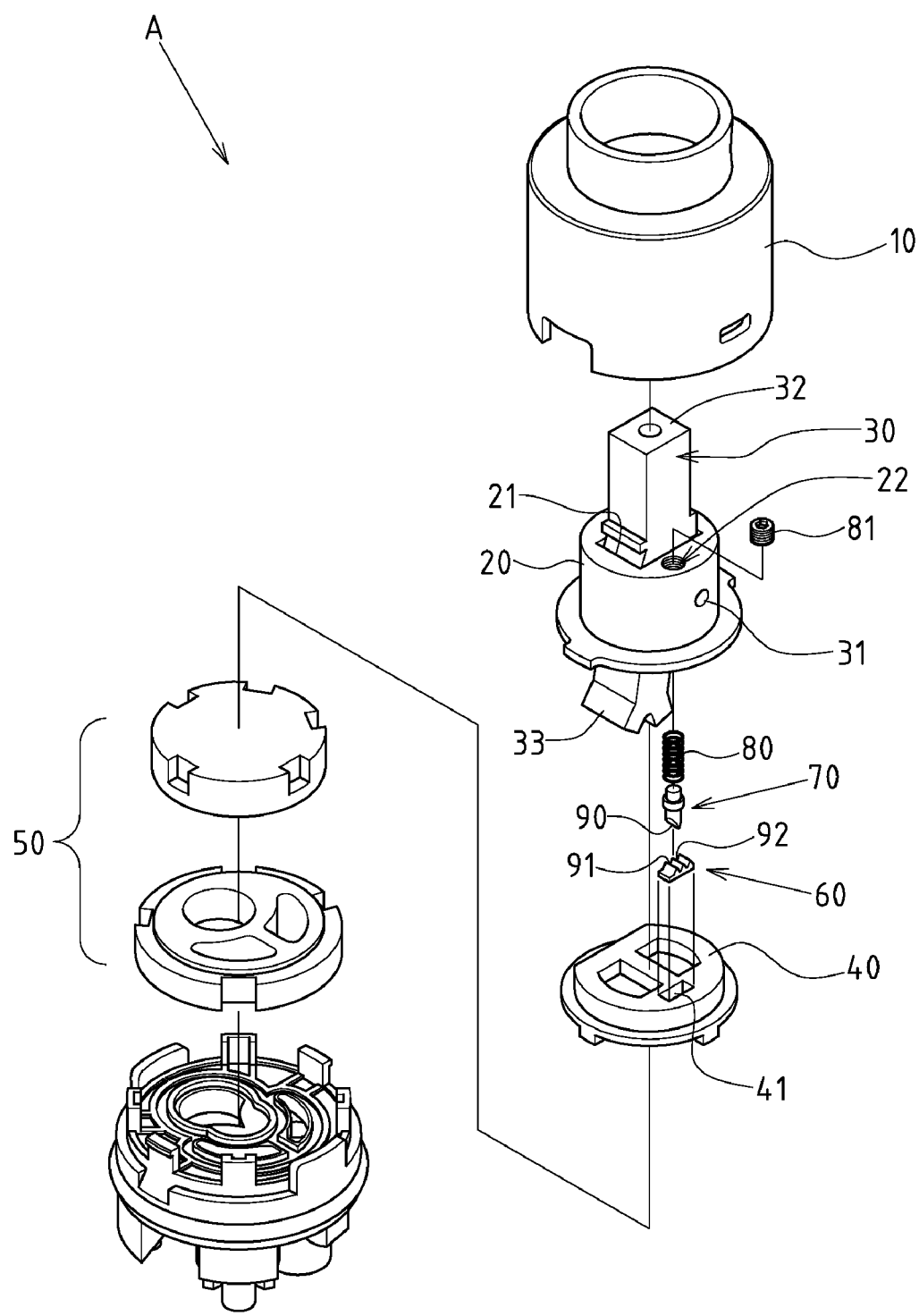
FIG. 1 shows an exploded perspective view of the overall components of the ceramic valve core in a preferred embodiment of the present invention.

The features and the advantages of the present invention will be more readily understood upon a thoughtful deliberation of the following detailed description of a preferred embodiment of the present invention with reference to the accompanying drawings.

FIGS. 1, 2, 3, and 4 depict preferred embodiments of a multi-stage positioning structure for a ceramic valve core of the present invention. The embodiments are provided for only explanatory purposes. The scope of the patent is determined by the claims.

The ceramic valve core A comprises a housing 10, a footstock 20, a brake valve handle 30, a coupling disc 40 and a water control valve unit 50. The middle section of brake valve handle 30 is adapted to a through hole 21 of footstock 20 using a cross axle 31, so that the top end 32 of the brake valve handle 30 can sway vertically to drive the displacement of the bottom 33. Furthermore, the coupling disc 40 and water control valve unit 50 can be driven to control the water flow and temperature state (note: the operating mode of the water control valve unit is not described herein because the water control valve unit is not relevant to the present invention). The top surface of coupling disc 40 may closely contact the bottom surface of the footstock 20 (see FIGS. 3, 4). The swaying motion of the brake valve handle 30 enables multi-stage positioning through this positioning structure.

The positioning structure of the present invention comprises a first snapper 60, which moves with the swaying brake valve handle 30.

There is also a second snapper 70, which is an integrated component positioned correspondingly to the displacement track of the said first snapper 60. A pin 90 is mated with at least two pin joint ends 91, 92, respectively at the first snapper 60 and second snapper 70.

The positioning structure further includes a flexible member 80, which allows the first snapper 60 or second snapper 70 to operate flexibly.

Figure 2:
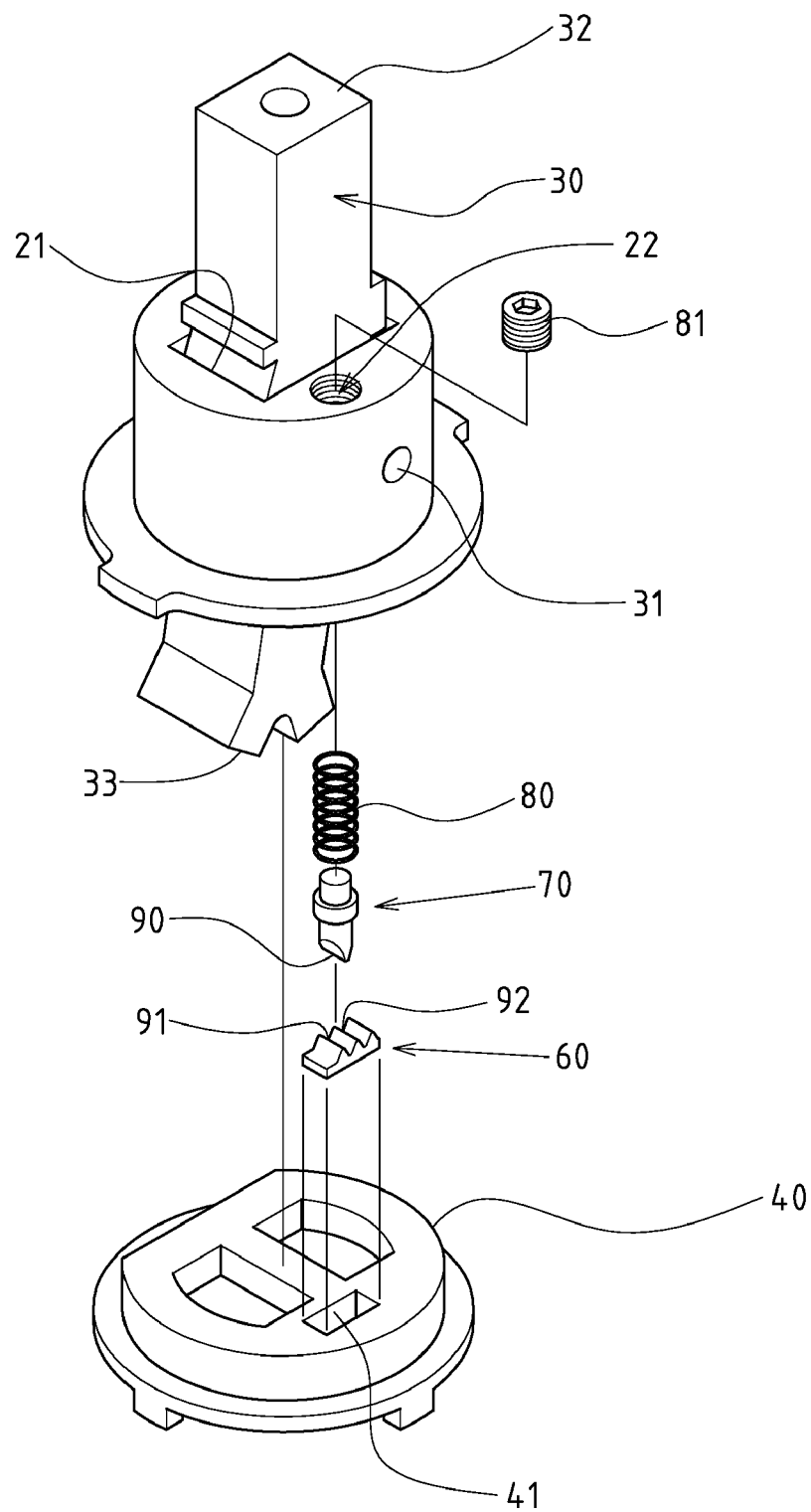
FIG. 2 shows an exploded perspective view of the local components of the ceramic valve core in a preferred embodiment of the present invention.

As shown in FIGS. 1, 2, the first snapper 60 may be an individually formed block. A groove 41 is placed at top of coupling disc 40 for insertion of first snapper 60. There are at least two pin joint ends 91, 92 at the top surface of the first snapper 60. The second snapper 70 may be a cylinder, such that the pin 90 is placed at the bottom. The footstock 20 is equipped with a vertical chamber 22 for accommodating the second snapper 70, such that the pin 90 of the second snapper 70 can protrude from the bottom of vertical chamber 22 for coupling with pin joint end 91 or 92 at the top of first snapper 60. The flexible member 80 may be a spring, which is mounted over the second snapper. A spacer 81 is mounted on top end of vertical chamber 22 to limit the flexible member 80 and second snapper 70, so the second snapper 70 may be pushed down flexibly with the flexible member 80.

The spacer 81 at top end of vertical chamber 22 may be a screw bolt, such that the elastic strength of flexible member 80 can be adjusted through its forward and backward displacement.

The pin 90 and pin joint end 91, 92 may be coupled through a cone cylinder and tapered groove.

Based upon above-specified structures, the operation of the present invention is described.

Figure 4:
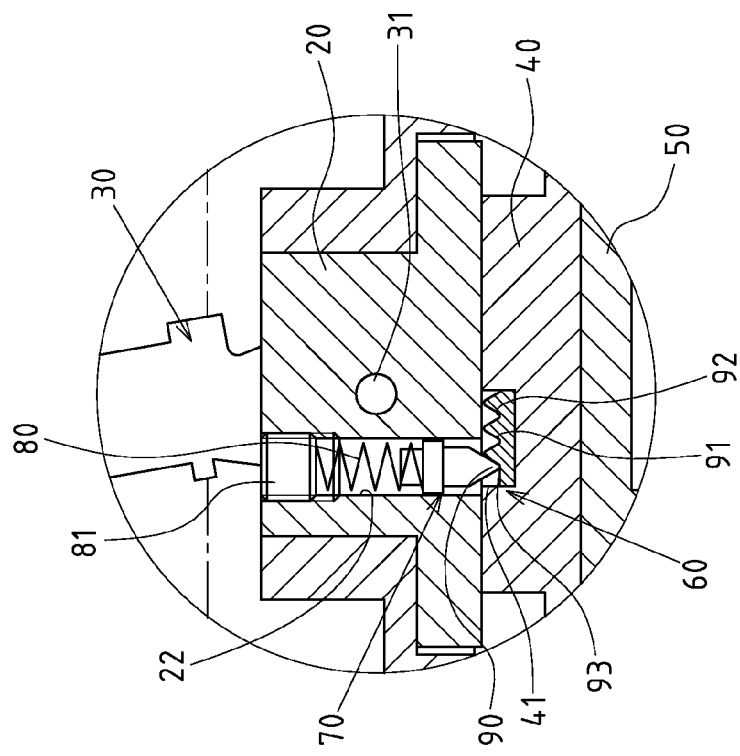
FIG. 4 shows a sectional view of the operation of the positioning structure corresponding to the state shown in FIG. 3.
Figure 3:
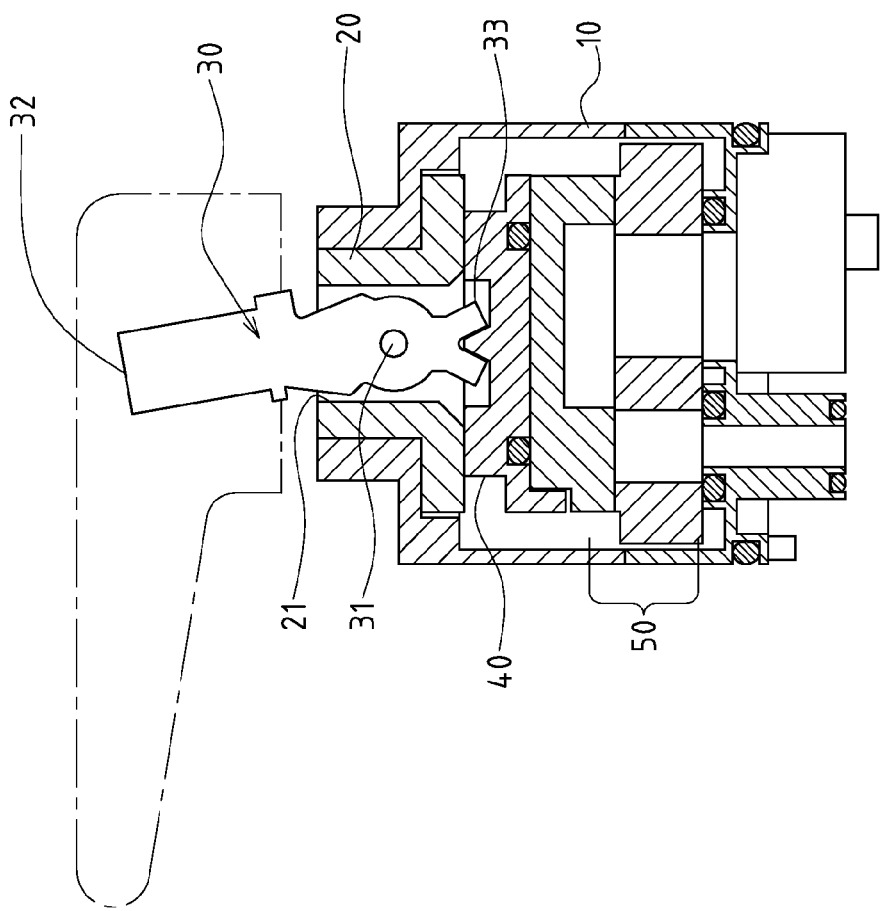
FIG. 3 shows a sectional view of an internal structure of the ceramic valve core in the first operation state of the present invention.

FIGS. 3, and 4 depict the operating state of the positioning structure when the brake valve handle 30 is in the closing mode. In such a case, the pin 90 of second snapper 70 is adapted to mate with pin joint end 93 at one side of the first snapper 60.

FIGS. 5, and 6 depict the operating state of the positioning structure when the brake valve handle 30 is in the opening mode with a preset angle (i.e. low flow rate). In such a case, the pin 90 of second snapper 70 is adapted to mate with pin joint end 91 at middle section of the first snapper 60, such that the brake valve handle 30 can be positioned tightly.

FIGS. 7, and 8 depict the operating state of the positioning structure when the brake valve handle 30 is in the opening mode with a maximum angle (i.e. high flow rate). In such a case, the pin 90 of second snapper 70 is adapted to mate with pin joint end 92 at rear section of first snapper 60, such that the brake valve handle 30 can be positioned.

Figure 9:
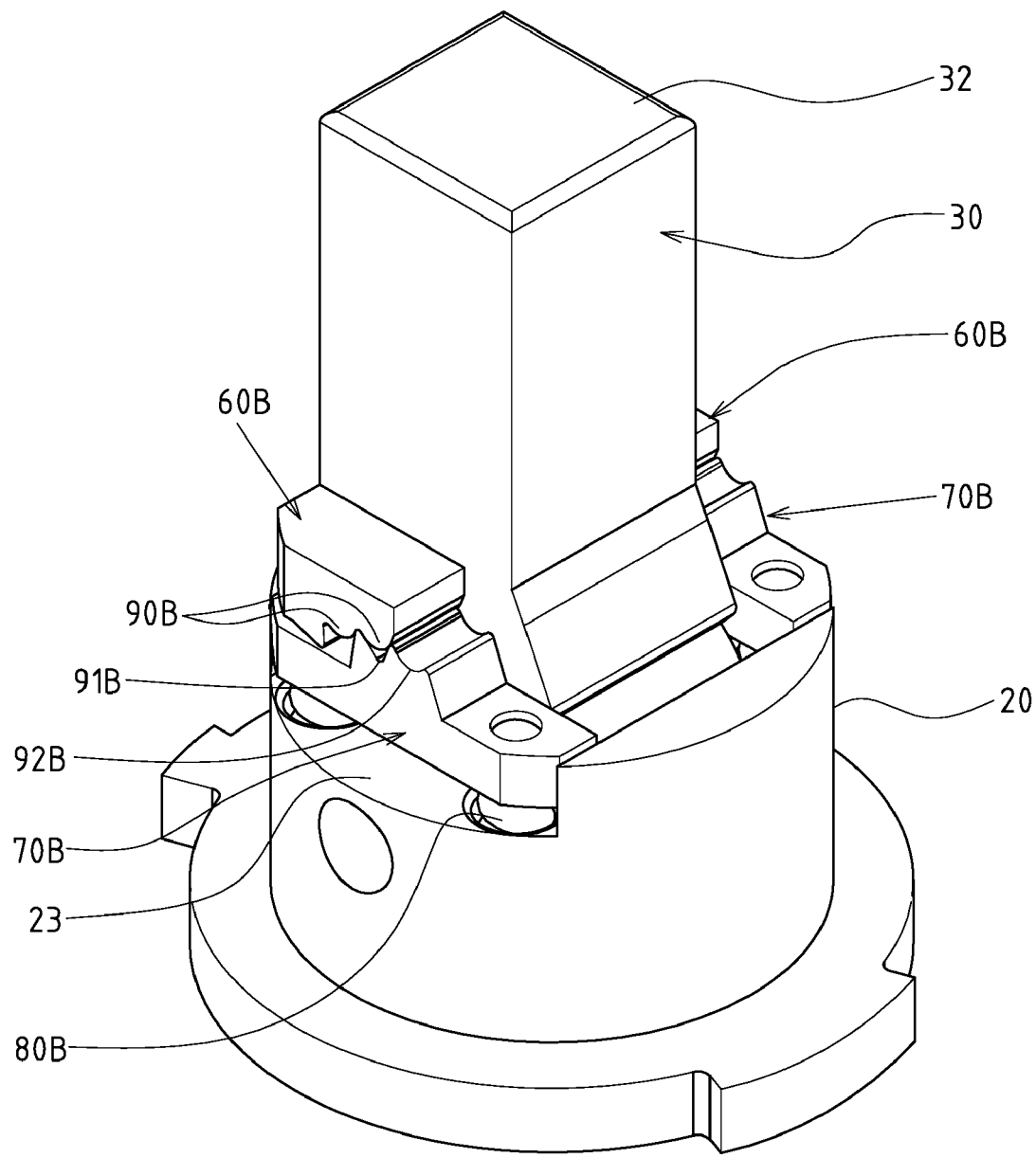
FIG. 9 shows a schematic view of an assembled block diagram of another embodiment of the positioning structure of the present invention.
Figure 10:
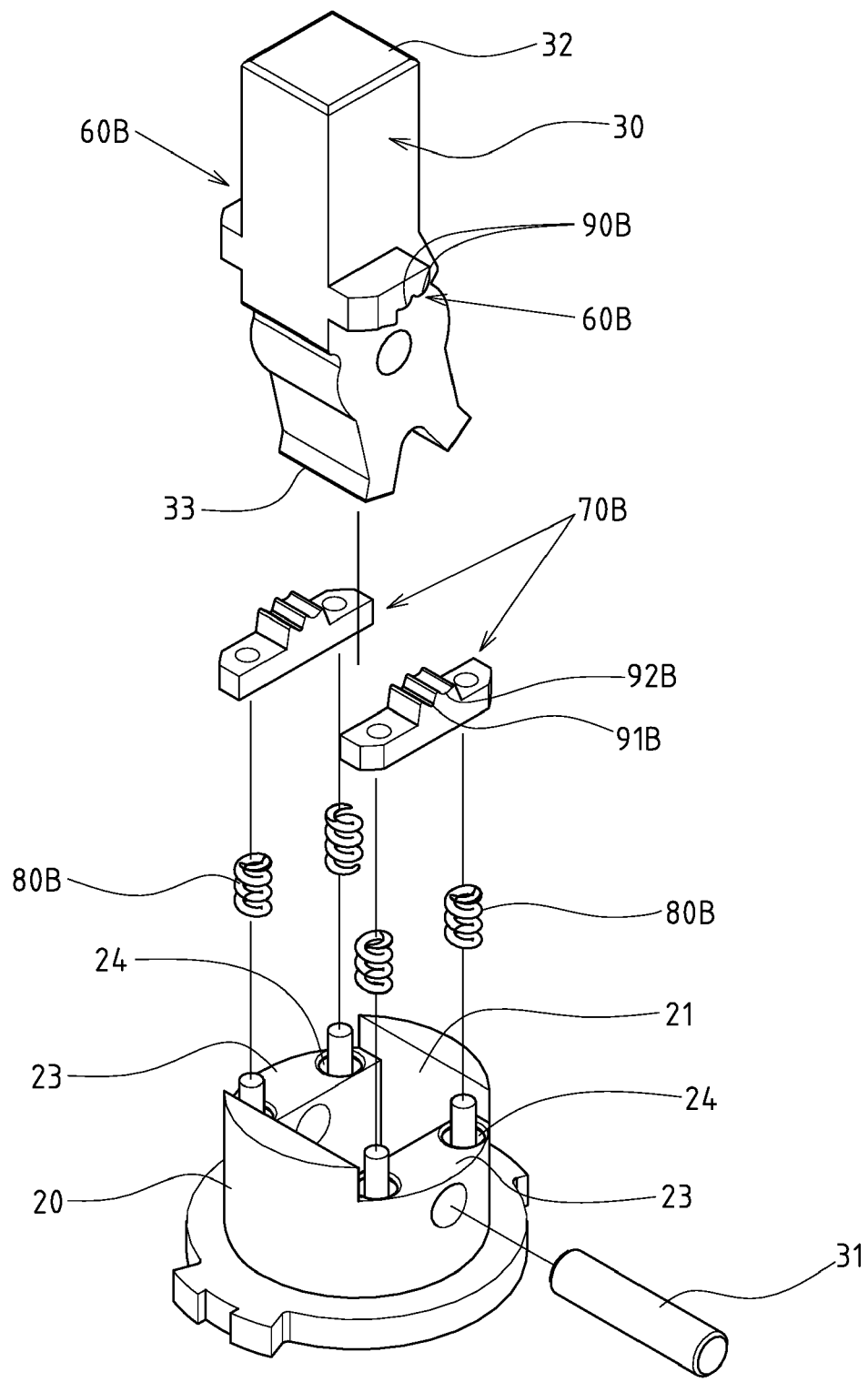
FIG. 10 shows a schematic view of an exploded block diagram of another embodiment of the positioning structure of the present invention.
Figure 11:
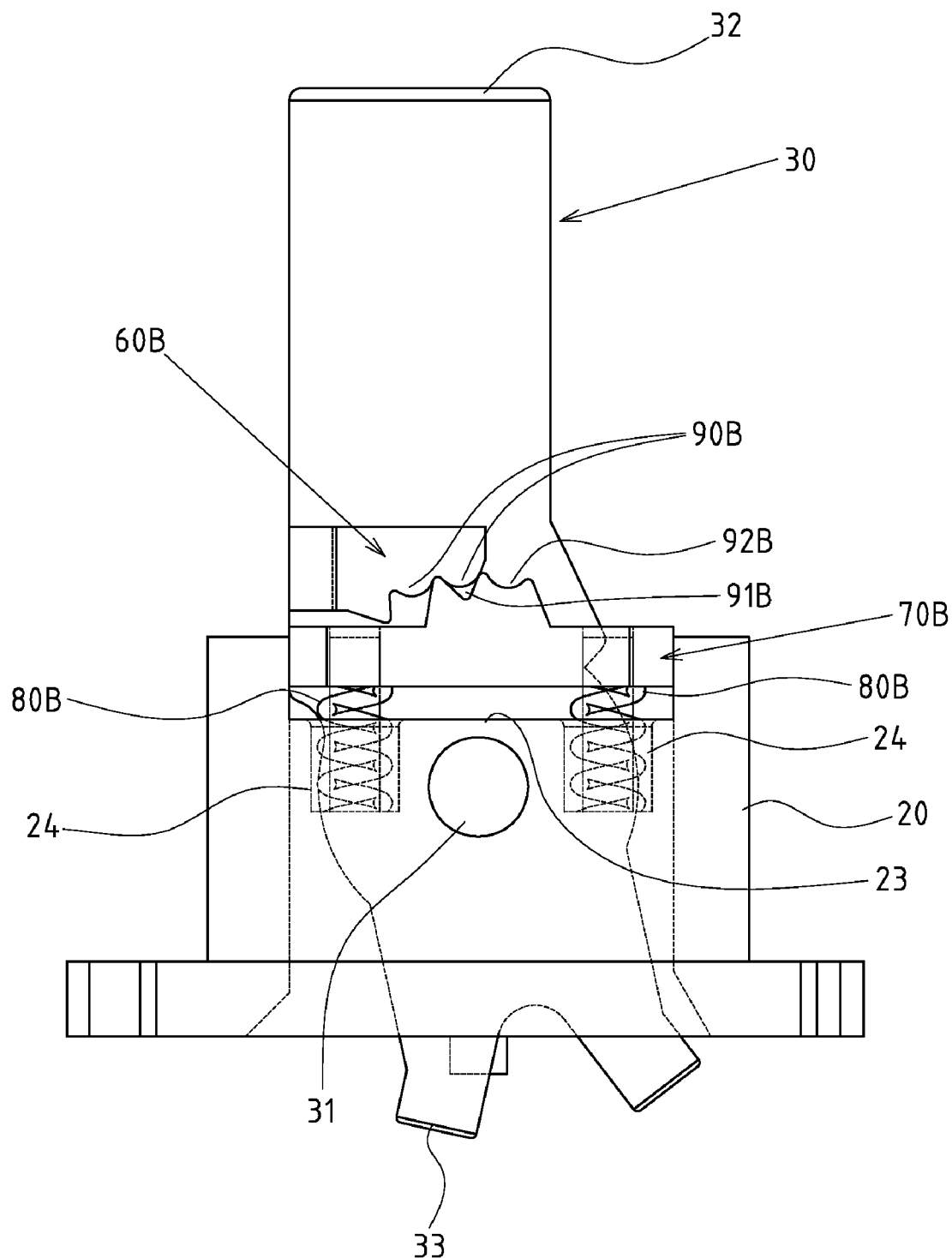
FIG. 11 shows a side elevation view of another embodiment of the positioning structure of the present invention.

FIGS. 9, 10, and 11 depict another preferred embodiment of the positioning structure of the present invention. The first snapper 60B is pre-formed laterally onto the brake valve handle 30, such that the pin 90B can be placed at a bottom of the first snapper 60B. The second snapper 70B may be an individually formed block. At the top surface of the second snapper, there are at least two pin joint ends 91B, 92B such that a groove 23 at a top surface of footstock 20 is placed opposite to the first snapper 60B for accommodating the second snapper 70B. The flexible member 80B may be a spring, which can be placed at lower part of second snapper 70B, and the groove 23 is provided with an inner hole 24 to limit the bottom of flexible member 80B. So, the second snapper 70B can be pushed up flexibly with the flexible member 80B. Also, the pin 90B and pin joint end 91B, 92B may be coupled through a corrugated structure.

Figure 12:
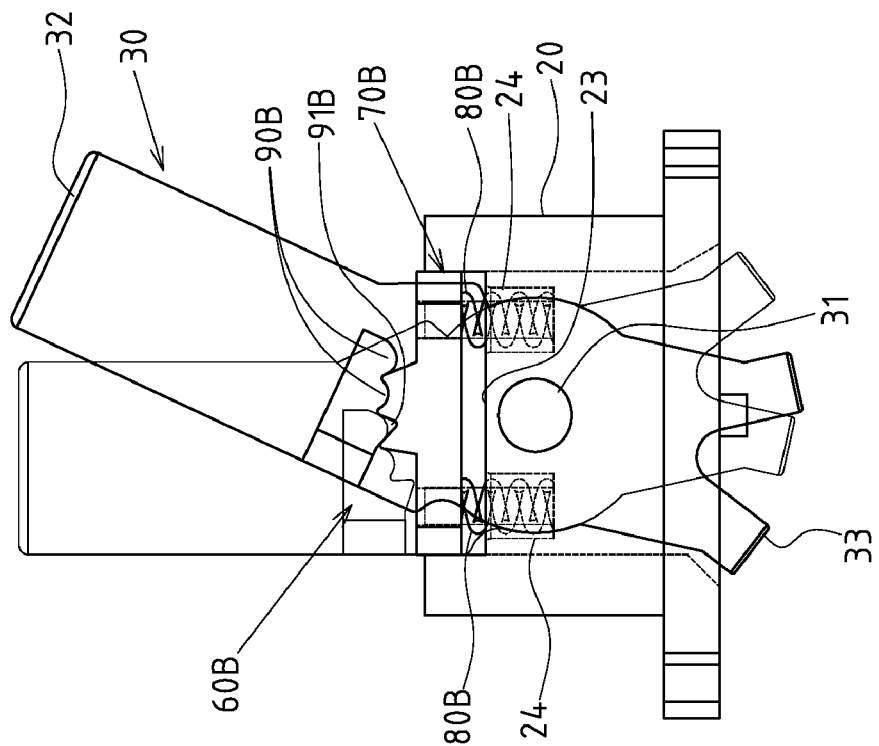
FIG. 12 shows a sectional view of the operation of another embodiment of the positioning structure of the present invention.
Figure 13:
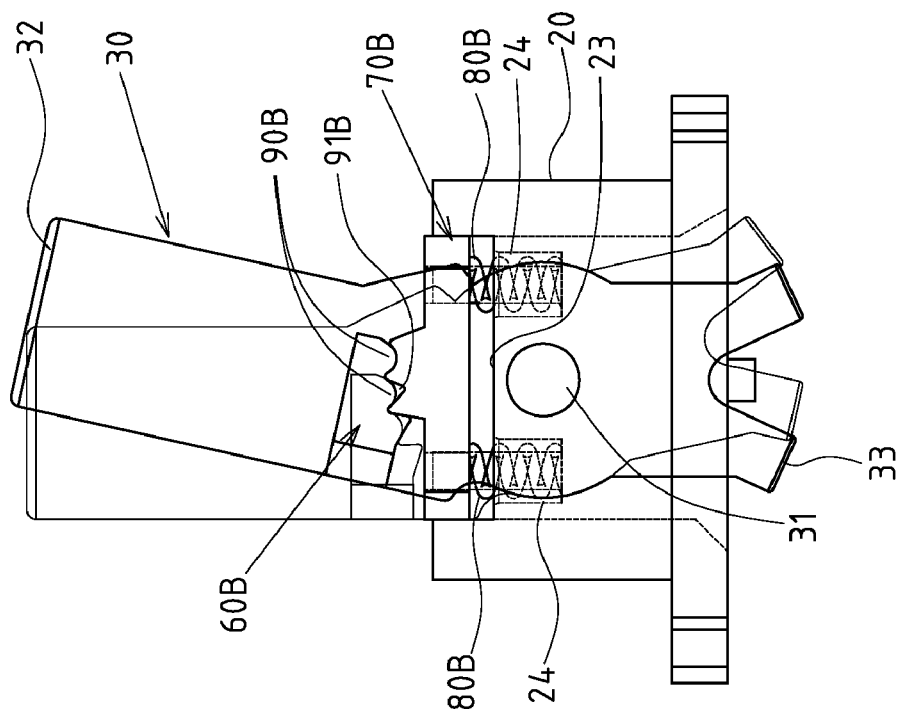
FIG. 13 shows another operational view of another embodiment of the positioning structure type of the present invention.

The positioning structure is shown in FIGS. 9, 10, 11, while the operating state is illustrated in FIGS. 12, 13. When the brake valve handle 30 sways to a preset angle with low water flow (see FIG. 12) and high water flow (referring to FIG. 13), the pin 90B at a top of first snapper 60B is separately snapped into pin joint end 91B or 92B at a top surface of the second snapper 70B, thereby serving the purpose of positioning the brake valve handle 30. When the pin 90B is to span over the pin joint end 91B or 92B, the second snapper 70B can be retracted flexibly for minimum wear with the help of flexible member 80B.

I claim:

1. A multi-stage positioning assembly comprising:
a housing;
a footstock received in said housing, said footstock having a through hole formed therein, said footstock having a bottom surface;
a brake valve handle having a middle section extending through said through hole, said brake valve handle secured by a cross axle to said footstock, said brake valve handle having a vertical swayable top end so as to cause a displacement of a bottom end of said brake valve handle;
a coupling disc having a top surface in close contact with said bottom surface of said footstock, said coupling disc movable relative to the swaying of said brake valve handle;
a water control valve unit positioned at a bottom of said coupling disc;

a first snapper movable relative to a movement of said brake valve handle, said first snapper having at least two pin joint ends formed therein;

a second snapper cooperative with a displacement track of said first snapper, and said second snapper having a pin at an end thereof; and a flexible member cooperative with said second snapper so as to allow said pin to flexibly cooperate with the pin joint ends, said first snapper being a block, said top surface of said coupling disc having a groove formed therein, said first snapper received in said groove, the pin joint ends formed on a top surface of said first snapper, said second snapper having a cylindrical shape, said pin extending from a bottom of said second snapper, said footstock having a vertical chamber receiving said second snapper therein, said pin protruding from a bottom of said vertical chamber, said flexible member being a spring mounted over said second snapper, said vertical chamber having a spacer mounted in a top end thereof so as to limit a movement of said flexible member and said second snapper, said flexible member urging said second snapper resiliently downwardly.

2. The assembly of claim 1, said spacer being a screw bolt, said screw bolt being adjustably mounted in said vertical chamber so as to adjust an elastic strength of said flexible member.

3. The assembly of claim 2, said pin having a cone-shaped end, the pin joint end being a tapered groove.

4. A multi-stage positioning assembly comprising:

a housing;

a footstock received in said housing, said footstock having a through hole formed therein, said footstock having a bottom surface;

a brake valve handle having a middle section extending through said through hole, said brake valve handle secured by a cross axle to said footstock, said brake valve handle having a vertical swayable top end so as to cause a displacement of a bottom end of said brake valve handle;

a coupling disc having a top surface in close contact with said bottom surface of said footstock, said coupling disc movable relative to the swaying of said brake valve handle;

a water control valve unit positioned at a bottom of said coupling disc;

a first snapper movable relative to a movement of said brake valve handle, said first snapper having at least two pin joint ends formed therein;

a second snapper cooperative with a displacement track of said first snapper, and said second snapper having a pin at an end thereof; and a flexible member cooperative with said second snapper so as to allow said pin to flexibly cooperate with the pin joint ends, said first snapper being a protruding block preformed laterally on at lest one side of said brake valve handle, said second snapper being a block, said footstock having a groove at a top surface thereof positioned opposite said first snapper so as to accommodate said second snapper, said flexible member being a spring positioned at a lower end of said second snapper, said groove having an inner hole so as to limit a bottom of said flexible member, said flexible member urging said second snapper upwardly.

5. The assembly of claim 4, said pin and the pin joint end being coupled through a corrugated structure.

* * * * *